March 28, 1961 N. B. DURHAM 2,977,137
FIFTH WHEEL

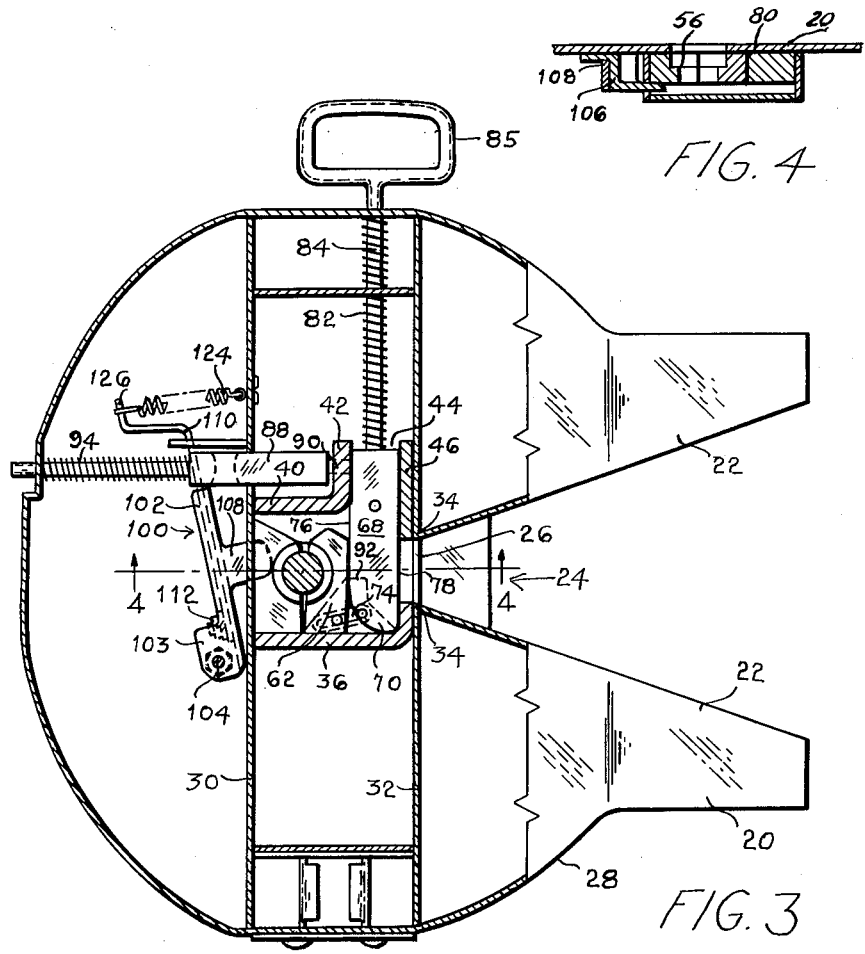
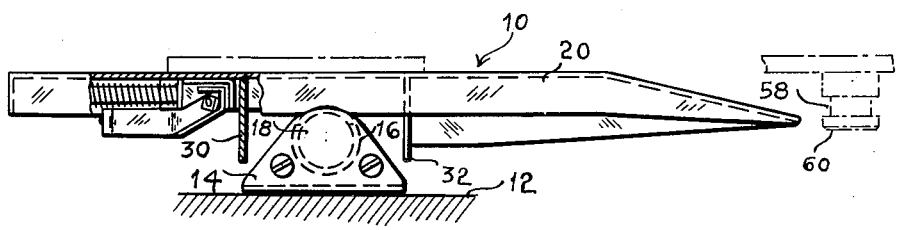

Filed Jan. 25, 1960 2 Sheets-Sheet 2

INVENTOR.
Nolan B. Durham
BY Dybvig and Jacox
His Attorneys

United States Patent Office 2,977,137
Patented Mar. 28, 1961

2,977,137
FIFTH WHEEL
Nolan B. Durham, 5289 Ormand Road, Dayton, Ohio, assignor of one-half to Robert H. Hummert, Dayton, Ohio Filed Jan. 25, 1960, Ser. No. 4,523
2 Claims. (Cl. 280—434)

This invention relates to a fifth wheel mechanism for coupling trailers or semi-trailers to tractors.

Numerous fifth wheel mechanisms have been devised which automatically couple a trailer having a vertical king pin depending from a front portion thereof to a tractor by merely moving the king pin into a slot or chamber in the fifth wheel. However, most of these mechanisms are quite complex. Since the parts of the fifth wheel must be quite strong to withstand the jolts incurred in coupling and while on the road, complex structures are necessarily expensive. Also, in automatic coupling mechanisms, it is necessary to lock the king pin almost instantaneously or else it will bounce out of engagement with the king pin slot. If the king pin does bounce out of the slot before the lock closes, an aggravating time loss is incurred, since the lock mechanism must first be removed from the slot before a second attempt to lock the king pin may be made. Generally, the more complex mechanisms suffer this problem under prolonged use, due to lost motion between the various elements of the mechanism as they wear. Accordingly, an object of this invention is to provide a fifth wheel mechanism having a simple, but rapidly acting automatic coupling mechanism.

Another problem presented by some prior fifth wheel mechanisms is that the surfaces on the king pin receiving jaws and on the locking elements are irregular and broken in contour. Under heavy use, the irregular surfaces become worn, rendering the mechanism unreliable and, at times, ineffective. Therefore, a further object of this invention is to provide an automatic coupling mechanism in which the engaging surfaces between the king pin receiving jaws and the locking element is substantially unbroken.

Another object of this invention is to provide a novel, simple mechanism for automatically resetting or tensioning the locking mechanism as a king pin is released.

Other objects and advantages reside in the construction of parts, the combination thereof, the method of manufacture and the mode of operation, as will become more apparent from the following description.

Referring to the drawings,

Figure 1 is a side view of a fifth wheel mechanism made in accordance with this invention.

Figure 3 is a view similar to Figure 2, showing the location of the parts in a king pin locking position.

Figure 4 is a sectional view of a position of the lock-in mechanism, taken substantially along the lines 4—4 of Figure 3.

Figure 2:
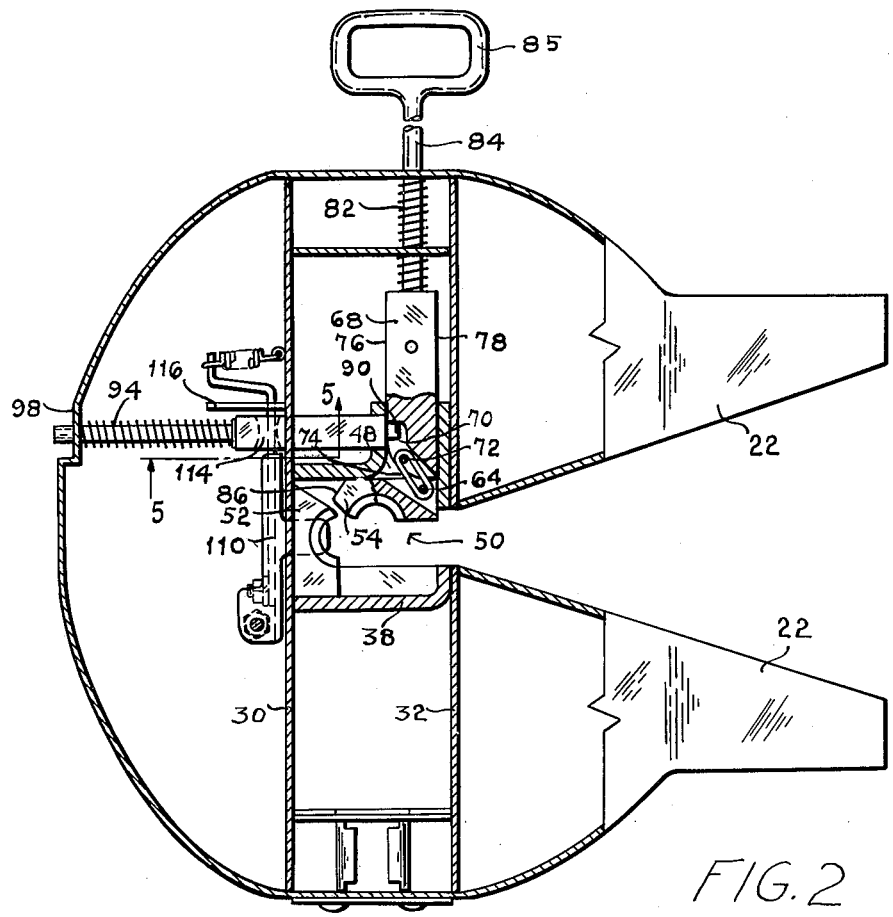
Figure 2 is a top view, with portions broken away, of the fifth wheel mechanism, showing the locking device in a tensioned position.

As shown in Figure 1, the fifth wheel 10 is mounted on the frame 12 of a truck by means of brackets 14 defining pivots 16 which receive pins 18. The fifth wheel 10 is then allowed to follow the movements of the trailer when driving up and down hills. The fifth wheel 10 has a conventional frame 20 provided with bifurcations 22 defining the sides of a V-shaped throat or slot 24 for guiding the king pin toward recess 26. The mounting brackets 14 and frame 20, as thus far described, are conventional and form no part of this invention. The frame 20 is provided with a top 28 which has been cut away in Figures 2 and 3 to disclose the parts located thereunder. It is to be understood that the top 28 extends over the entire frame but for the V-shaped throat 24 and the recess 26. Similarly, the bottom of the fifth wheel frame may be covered by a sheet metal member (not shown).

The frame 20 is provided with a pair of parallel, transversely extending plates 30 and 32. The plates 30 is continuous; but plate 32 is broken to form an aperture 34 communicating between the bifurcations 22 forming the recess 26. The plates 30 and 32 are connected on one side of the recess 26 by a longitudinally extending frame plate 36 having a flange 38 which acts as a lock retaining plate, as will be discussed below. An L-shaped frame plate 40 extends normally from the plate 30 on the other side of the recess 26. One leg 42 of the plate 40 extends parallel to the plates 30 and 32 and forms one-half of a transverse guide 44. The guide 44 is completed by another plate 46 mounted against the transverse plate 32. The plates 40 and 46 may have a common base 48 and be made as a unit to be attached between the transverse plates 30 and 32.

The plates 36, 40 and 42 along with the portion of the plate 30 extending between the plates 36 and 40 define what may be termed a jaw chamber 50. Mounted within chamber 50 is a fixed jaw 52 and a floating jaw 54. The fixed jaw 52 is firmly attached to both plates 30 and 36. As may be best seen in Figure 4, both jaws are provided with a lip 56 for circling an annular recess in the king pin, such as the recess 58 provided in the king pin 60 shown in dotted lines in Figure 1.

The floating jaw 54 has an internal recess 62 provided with a vertically extending pin 64. A locking bar 68 likewise has an internal recess 70 provided with a vertically extending pin 72. A heavy steel band or link 74 connects the floating jaw 54 with the locking bar 68 so that the movements of jaw 54 will be controlled by the movements of the bar 68. The locking bar 68 has flat sides 76 and 78 movable along guide 44 from the retracted position shown in Figure 2 to the locked position shown in Figure 3. In the locked position, the flat side 76 engages a flat side 80 of the floating jaw 54. The other flat side 78 of the bar 68 engages the flange or lock retainer 38 and the guide plate 46 so that sideways movements of the locking bar 68 and the jaw 54 are prevented. With this construction, the jaws 52 and 54 hold the king pin 60 rigidly therebetween.

The locking bar 68 is biased into the locking position shown in Figure 3 by means of a locking compression spring 82 coiled about a rod 84 fixed to the locking bar 68, which terminates in a handle 85 outside the frame 12. The king pin may only be released from the jaws 52 and 54, as shown in Figure 3, by retracting the locking bar against the bias of spring 82 to the position shown in Figure 2. Upon retraction of the locking bar 68 from the locking position shown in Figure 3, the floating jaw 54 rotates slightly within the jaw chamber 50. Further retraction of the bar 68 causes a cam surface 86 on the jaw 54 to strike the side of plate 40, thereby causing further rotation of the jaw 54 into the position shown in Figure 2. Note that in the position shown in Figure 2, the jaw 54 is held substantially immobile against the plates 40 and 46. The king pin 60, which was encircled by the jaws 52 and 54, is, of course, free to move out of the jaw chamber 50 after the floating jaw 54 moves from the position shown in Figure 3 to that shown in Figure 2.

When the locking bar 68 has been retracted from the position shown in Figure 3 to that shown in Figure 2, it is prevented from returning to a locking position by a detent arm 88 having a small detent pin 90 located on the end thereof seated within the recess 70 and in abutment with the side 92 of the recess. Of course, separate recesses could be provided for the vertical pin 72 and detent pin 90; but it is more convenient to utilize the single recess 70. The detent arm 88 is biased into engagement with the locking bar 68 by a detent compression spring 94 coiled around rod 96 which is attached to the arm 88 and extends through an aperture in a flat wall portion 98 on the frame 12. To ensure registration of the detent pin 90 with the recess 70, the detent arm is guided through apertures provided in the plate 30 and the leg 42 of the plate 40.

Figure 5:
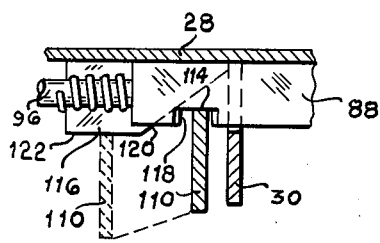
Figure 5 is a sectional view of a position of the locking mechanism, taken substantially along the lines 5—5 of Figure 2. This figure also illustrates two positions of a release lever employed in the present invention, one in broken line detail and one in solid line detail.

The detent pin 90 is automatically removed from the recess 70, thereby releasing the locking arm so that it moves to the locking position of Figure 3 by a release mechanism 100. The release mechanism 100 includes an actuating lever 102 having an enlarged end 103 rotatably mounted about a vertical pivot pin 104 which is attached to the frame 20. The lever 102 has a depending flange 106 extending along the length thereof provided with a lug 108 extending through plate 30. A release lever 110 is pivotally attached about a horizontal pivot 112 to the actuating lever 102. As best shown in Figure 5, the release lever 110 lies within a notch 114 provided in the bottom of the detent arm 88. A cam plate 116 is mounted on the transverse plate 30 adjacent the detent arm 88 to cam the release lever 110 downwardly, as will be described below.

The operation of the release mechanism 100 is as follows. With the locking bar 68 in the retracted position shown in Figure 2, the lug 108 on the actuating lever 102 extends into the jaw chamber 50 below the fixed jaw 52 (see Figure 4). When a king pin, such as pin 60 shown in Figure 1, enters the jaw chamber 50, the lower portion of the king pin strikes the lug 108, causing the actuating lever 102 to pivot counterclockwise from the position shown in Figure 2 to the position shown in Figure 3. The flange 106 on lever 102 causes the release lever 110 to likewise move counterclockwise, thereby engaging the horizontal surface 118 of the notch 114 and moving the detent arm 88 by overcoming the detent spring 94. By this movement, the release lever 110 causes the detent pin 90 to be removed from engagement with the side 92 of the recess 70, whereupon the locking bar 68 is biased into the locking position shown in Figure 3. As the release lever 110 moves the detent arm 88 to the left, as viewed in Figures 2 and 3, the cam surface 120 on cam plate 116 (Figure 5) cams the lever 110 downwardly about the horizontal pivot 112 until the release lever 110 is removed from the notch 114 into engagement with the bottom surface 122 of the cam plate 116, as shown by dotted lines in Figure 5. After the release lever 110 is cammed out of engagement with the notch surface 118, the detent arm 88 is free to be biased by the spring 94 to the right, as viewed in Figure 3. Since the detent arm 88 is not freed from the release lever 110 until after the locking bar 68 has reached the Figure 3 position, the detent pin 90 is held in engagement with the flat side 76 of the locking bar. The final position of the release lever 110 and detent arm 88 is shown in Figure 3. Since the detent arm 88 is disengaged from the lever 110 in this position, the bar 68, when retracted, will be held by the detent arm even though the king pin is still in the jaw chamber.

As described above, when it is desired to release the king pin from the jaws 52 and 54, the locking bar 68 is retracted by pulling on handle 85 until the floating jaw 54 arrives at the position shown in Figure 2. When the locking bar 68 is sufficiently retracted, the detent pin 90 engages within recess 70 to prevent return of the locking bar. A king pin may then be removed from the chamber 50. After the king pin is removed, a return spring 124, mounted between the plate 30 and the free end 126 of the release lever 110, draws both the release lever and the actuating lever 102 back to the Figure 2 position, wherein the flange 106 abuts the plate 30 and the lug 108 extends into the jaw chamber 50 beneath and beyond the fixed jaw 52. The return spring 124 extends upwardly from left to right, so that the release lever 110 is positively returned to a position within notch 114, as indicated by the broken and solid line details in Figure 5. The locking mechanism is thus in the tensioned position shown in Figure 2 and again ready to receive a king pin.

It is seen then that the operation of the locking mechanism is fully automatic. The locking spring 82 is tensioned by the uncoupling movement of handle 85. Both compression springs 82 and 94 act in a linear direction, thereby their power is utilized to the fullest extent. The power of return spring 124 is not fully utilized; but need not be, since its action is not as critical as that of the springs 82 and 94. The construction shown in the drawings is also advantageous, in that there is a maximum transmission of the force of a king pin striking the lug 108, since the force is applied normally to the direction of movement of the levers 102 and 110.

The construction of the levers 102 and 110, in which one lever is pivotally attached to the other, is especially valuable. With this construction, the two levers act primarily as one lever which can be cammed out of the notch 114, for releasing the detent arm 88, so that the locking bar 68 may be held in the retracted position before the king pin is moved from the jaw chamber. However, if only one such lever were provided, it could not be as strong as the two levers 102 and 110, since it would have to be resilient and much thinner.

It is to be observed that the king pin locking mechanism is virtually fail-proof when in the locking position as illustrated in Figure 3. Thus, the king pin can be released only if the locking bar 68 is retracted or if the locking bar breaks. Retraction of the locking bar is prevented by the detent 90, and even if this detent should fail while the vehicle is in motion, the spring 82 in cooperation with the frictional forces existing between the locking bar 68 and the adjacent frame portions 38 and 46 would provide strong opposition to retraction thereof. Breakage of the locking bar is highly improbable, due to the fact that the load transmitted thereto by the king pin is distributed over a large area thereof by virtue of the shape of the floating jaw 54. Furthermore, even if the locking bar 68 should break, it is unlikely that the break would occur in such a manner that sufficient clearance is provided to enable the floating jaw 54 to swing out of the path of the king pin.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A fifth wheel mechanism for coupling a tractor and a trailer comprising: a frame adapted to be mounted on the tractor, a fixed jaw mounted on said frame, a floating jaw, a locking bar slidably mounted on said frame for locking the floating jaw against the fixed jaw, said floating jaw being connected wtih the locking bar for movement therewith, biasing means urging said locking bar into a locking position in which the fixed jaw and the floating jaw encircle a king pin mounted on a trailer and the locking bar abuts the floating jaw.

detent means preventing movement of said locking bar into said locking position, said detent means including a detent arm provided with a vertical abutment surface, and trip mechanism actuated by a king pin upon engaging the fixed jaw for releasing said detent means from engagement with said bar, said trip mechanism including a lever engaging said surface to move the detent arm away from engagement with the bar, and a cam provided in the path of said lever for removing the lever from the abutment surface, thereby releasing said detent arm from said trip mechanism.

2. A fifth wheel for coupling trailers to tractors of the type having a king pin receiving chamber comprising: a locking bar slidable from a king pin locking position to a retracted position, guide means adjacent the chamber confining said bar in a path normal to the path of travel of a king pin passing through the slot, a pair of jaws mounted within the chamber, one of said jaws being connected to said locking bar for movement therewith so that the jaw encircles a king pin when the bar is in the locking position, but the said one jaw is moved out of the path of the king pin when the bar is in the retracted position, detent means for holding the bar in said retracted position, said detent means including a detent arm provided with a vertical abutment surface, trip means actuated by a king pin upon entering the chamber for releasing said detent means, whereby said locking bar moves from the retracted to the locking position to confine the king pin within the chamber, said trip means including a lever engaging said surface to move the detent arm away from engagement with the bar, and a cam in the path of said lever for removing the lever from the abutment surface after the detent arm is disengaged from the locking bar permitting the locking bar to move to the locking position, said cam causing said lever to move out of engagement with said detent arm to release the arm whereupon it returns to engagement with the locking bar.

References Cited in the file of this patent

UNITED STATES PATENTS

| | | |
|---|---|---|
| 2,371,750 | Fontaine | Mar. 20, 1945 |
| 2,456,826 | Fontaine | Dec. 21, 1948 |
| 2,726,878 | Fontaine | Dec. 13, 1955 |